United States Patent
Schatz et al.

(10) Patent No.: US 11,010,202 B2
(45) Date of Patent: May 18, 2021

(54) DISTRIBUTED PHYSICAL PROCESSING OF MATRIX SUM OPERATION

(71) Applicant: Facebook, Inc., Menlo Park, CA (US)

(72) Inventors: Martin Schatz, Seattle, WA (US); Amin Firoozshahian, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 21 days.

(21) Appl. No.: 16/533,588

(22) Filed: Aug. 6, 2019

(65) Prior Publication Data
US 2021/0042116 A1 Feb. 11, 2021

(51) Int. Cl.
*G06F 9/50* (2006.01)

(52) U.S. Cl.
CPC ............ *G06F 9/5061* (2013.01); *G06F 9/505* (2013.01)

(58) Field of Classification Search
CPC ........ G06F 9/505; G06F 9/5061; G06F 17/16; G06F 9/5066; G06F 9/5077; G06F 9/5083
See application file for complete search history.

(56) References Cited

U.S. PATENT DOCUMENTS

| | | | | |
|---|---|---|---|---|
| 10,521,488 B1* | 12/2019 | Ross | | G06F 17/16 |
| 10,691,464 B1* | 6/2020 | Drego | | G06F 9/5061 |
| 2009/0030960 A1* | 1/2009 | Geraghty | | G06F 17/16 |
| | | | | 708/203 |
| 2011/0208872 A1* | 8/2011 | Liddell | | G06F 9/505 |
| | | | | 709/231 |
| 2011/0307685 A1* | 12/2011 | Song | | G06F 17/10 |
| | | | | 712/16 |
| 2012/0063658 A1* | 3/2012 | Leroux | | G06T 11/006 |
| | | | | 382/131 |
| 2013/0325873 A1* | 12/2013 | Sitsky | | G06F 9/505 |
| | | | | 707/741 |
| 2014/0298351 A1* | 10/2014 | Usui | | G06F 17/16 |
| | | | | 718/107 |
| 2016/0378568 A1* | 12/2016 | Knox | | G06F 9/5083 |
| | | | | 718/105 |
| 2018/0188972 A1* | 7/2018 | Yang | | G06F 11/1048 |
| 2019/0340486 A1* | 11/2019 | Mills | | G06F 7/5443 |

OTHER PUBLICATIONS

Caffe2 (Sparse Operations | Caffe 2), archived on Jul. 6, 2017, 9 pages, accessed at https://web.archive.org/web/20170706015555/https://caffe2.ai/docs/sparse-operations.html on Oct. 18, 2020 (Year: 2017).*

Caffe2 (Operators Catalog | Caffe 2), archived on Jul. 5, 2017, 205 pages, accessed at https://web.archive.org/web/20170705225238/https://caffe2.ai/docs/operators-catalogue.html on Oct. 19, 2020 (Year: 2017).*

* cited by examiner

*Primary Examiner* — Keith E Vicary
(74) *Attorney, Agent, or Firm* — Van Pelt, Yi & James LLP (57) ABSTRACT

A specification of an operation to perform one or more element-wise sums of specified portions of a matrix is received. The specification of the operation is analyzed to select a type of processing load partitioning to be applied. Based on the selected type of processing load partitioning to be applied, processing required to perform the operation is partitioned across a plurality of physical processing elements in parallel. The partitioned processing is distributed to the physical hardware processing elements to perform in parallel the element-wise sums of the specified portions of the matrix.

20 Claims, 8 Drawing Sheets

DISTRIBUTED PHYSICAL PROCESSING OF MATRIX SUM OPERATION

BACKGROUND OF THE INVENTION

Matrix operations are central components in many numerical algorithms used in scientific and engineering computations. For example, summing elements along one or more dimensions in a matrix is an important part of artificial intelligence computations, such as inference. Matrix operations are often computationally intensive, requiring significant computer memory, processor, and data transfer resources. Many operations are associated with heavy compute and data movement components. There exists a need for hardware and techniques to reduce the computational burden of matrix operations.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Distributing physical processing of matrix sum operations is disclosed. In some embodiments, a specification of an operation to perform an element-wise sum of specified portions of a matrix is received. The specification of the operation is analyzed to select a type of processing load partitioning to be applied. Processing required to perform the operation is partitioned across a plurality of physical processing elements in parallel based on the selected type of processing load partitioning to be applied. The partitioned processing is distributed to the physical processing elements to perform in parallel the element-wise sum of the specified portions of the matrix. Practical and technological benefits of the disclosed techniques include reduced latency of matrix operations, reduced power consumption, and potentially more compute resources to allocate to other workloads.

In some embodiments, the element-wise sum of specified portions of the matrix is performed by a system in which individual compute units (also referred to herein as processing elements) have their own private memory space and can communicate amongst themselves in regular patterns using a set of communication primitives. Due to the connected nature of these processing elements, the system can be viewed as a distributed-memory parallel system. In various embodiments, the element-wise sum of specified portions of the matrix is a challenging operation to parallelize as it can require reading a significant amount of data in an irregular manner and can have a relatively low arithmetic intensity, limiting the number of computations that can be used to hide the cost of data movement. Further magnifying the complexity is that the computations required may be unevenly distributed among output elements.

Parallelization of output elements and parallelization of computation of individual output elements can be performed. In some embodiments, a subset of processing elements can saturate the total memory bandwidth of a mesh of processing elements, which allows for the allocation of only a subset of processing elements to memory-traffic related operations, leaving additional processing elements available to bolster computation. As mentioned above, one challenge is that each output element can vary in terms of the number of computations required, leading to load imbalance among processing elements if parallelized inefficiently. To address this, in some embodiments, a load-balance operation is performed so that each processing element is responsible for approximately the same number of overall computations.

Processing elements may be grouped into units where each group of units is assigned one or more output elements based on a load balancing approach. Computation of each output element can be parallelized across the processing elements in a given group. By grouping compute units, memory-intensive portions of the element-wise sum operation can be balanced with compute-intensive portions by adjusting the balance of memory-traffic focused units to compute focused units. An alternate parallelization scheme in which all output elements are assigned to each processing element can also be used. Under this scheme, each processing element is responsible for computing a unique partial update to each output element. Once all partial updates are computed (in parallel), a final reduction involving all processing elements accumulates the partial updates into the final output.

Figure 1A:
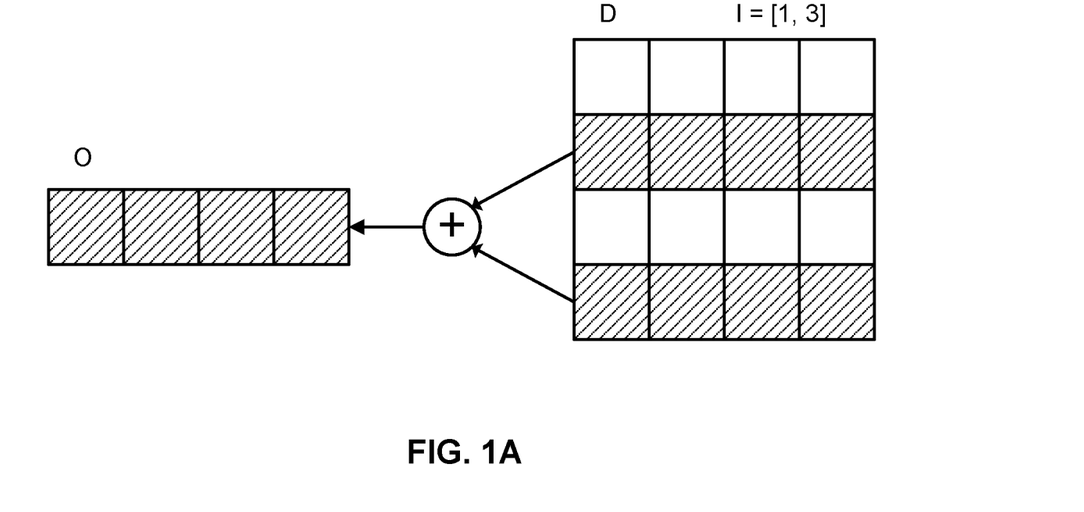
FIGS. 1A and 1B illustrate examples of performing element-wise sums of specified portions of matrices.
Figure 1B:
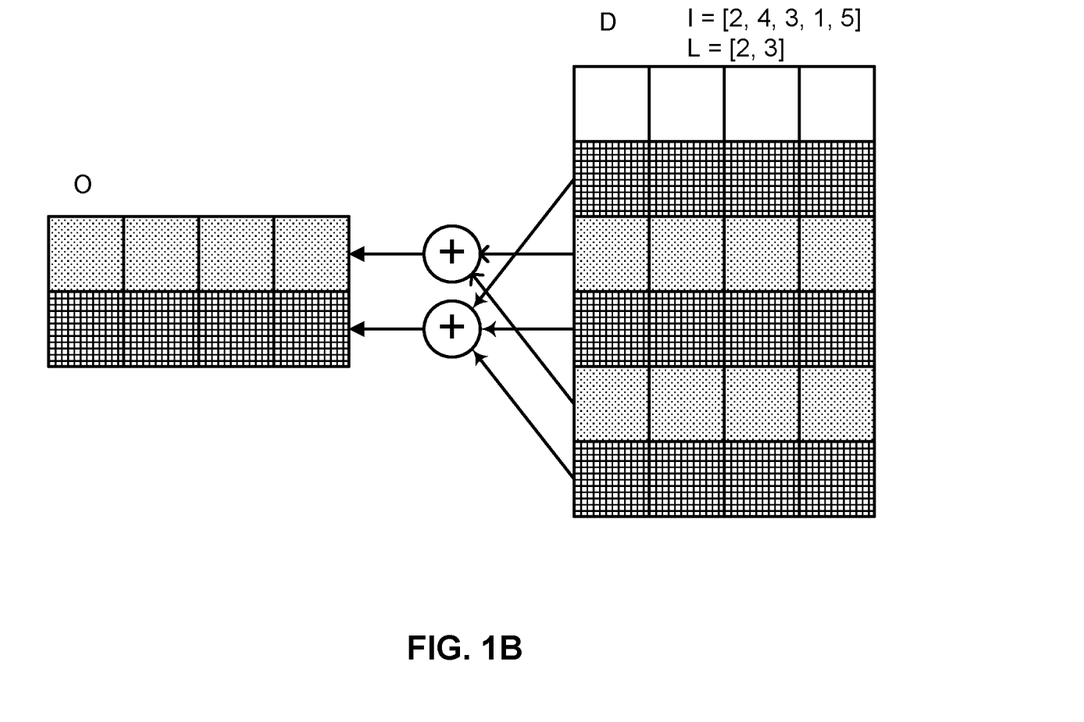

FIGS. 1A and 1B illustrate examples of performing element-wise sums of specified portions of matrices. FIG. 1A illustrates an element-wise sum involving data tensor D (e.g., a matrix) and indices vector I. An element-wise sum of tensor slices such that output $O[:]=sum(D[I[:],:])$ is computed. In this example, the sum is only in the first dimension and the remaining dimensions are retained in the output. As illustrated in FIG. 1A, this computation can be represented graphically with the shaded output O equaling the sum of the two shaded input regions of D. The index positions of D to be summed are at 1 and 3 because index numbering starts at zero.

FIG. 1B illustrates a more complicated element-wise sum. In the example illustrated in FIG. 1B, multiple independent sum operations acting on different index sets are performed. Each sum corresponds to a different row of output O. In the example shown, providing for multiple independent sum operations is accomplished by concatenating the sets of indices involved in separate sums together and supplying a lengths vector L to delineate between contributions to each output. For example, as shown in FIG. 1B, the lengths vector L indicates that the first output sum involves contributions from the first two index positions of I. Thus, as indicated by the shading, the first output sum includes $D[2,:]$ and $D[4,:]$ (where index numbering starts at zero). Similarly, because the lengths vector L indicates that the second output sum involves contributions from the next three index positions of I, $D[3,:]$, $D[1,:,:]$, and $D[5,:]$ are summed to obtain the second output sum (as indicated by the second type of shading in FIG. 1B).

Having multiple independent sum operations introduces a computational imbalance between output slices in that different output slices typically have different computational requirements. For example, as shown in FIG. 1B, the first output sum involves summing at two index positions, whereas the second output sum involves a more computationally intensive summing at three index positions. In general, the imbalance may be much greater (e.g., summing at just two index positions for a first output sum, summing at 10 index positions for a second output sum, summing at 50 index positions for a third output sum, and so forth). In general, an arbitrarily large number of index positions may be involved in producing a single output sum. Stated alternatively, each slice of output O has potentially dramatically different computational costs associated with it. To take advantage of a distributed-memory parallelism system (e.g., a system configured to distribute physical processing), computational loads are balanced across processing elements.

Performing element-wise sums of specified portions of a matrix has applications in many technical fields. For example, such an operation is used in many neural network representations (e.g., SparseNN models). Element-wise summing may be performed to combine entries in a table (e.g., weights associated with connections in a neural network). Combining entries is useful in various applications (e.g., to generate a metric for matching, such as matching of images to tags in an image recognition model, advertisements to users in an advertising model, etc.).

Figure 2:
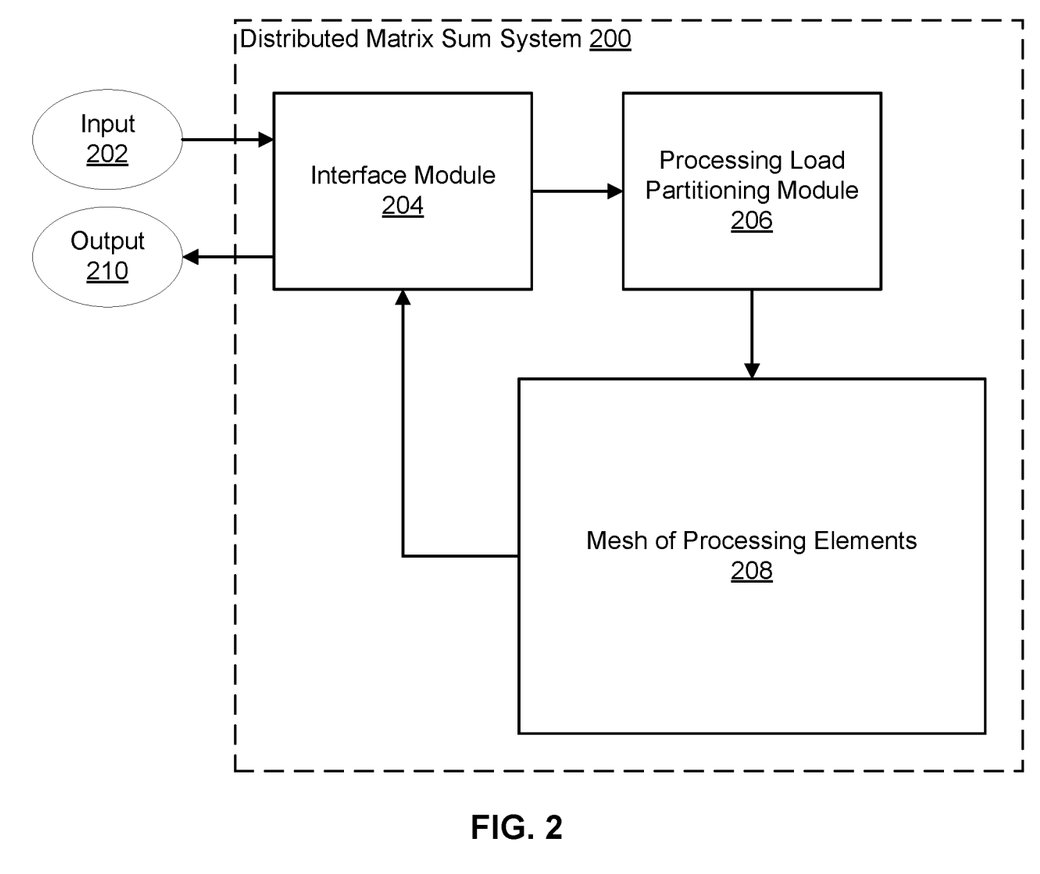
FIG. 2 is a block diagram illustrating an embodiment of a system for distributing physical processing of matrix sum operations.

FIG. 2 is a block diagram illustrating an embodiment of a system for distributing physical processing of matrix sum operations. Distributed matrix sum system 200 takes input 202 and produces output 210. In some embodiments, input 202 includes a data tensor (e.g., matrix) D and an indices vector I. FIG. 1A shows an example input including a data tensor D and an indices vector I. Input 202 may also include a lengths vector L. FIG. 1B shows an example input including a data tensor D, an indices vector I, and a lengths vector L. In some embodiments, output 210 is an output vector/matrix/tensor O comprising the result of a sum operation. FIG. 1A shows an example of an output O resulting from summing a data tensor D in the first dimension at specific index positions. Output 210 may also include results from other sum operations. Stated alternatively, output 210 may include results from multiple independent sum operations. FIG. 1B shows an example output in which two separate sets of indices of a data tensor D contribute to two separate output sums as delineated by a lengths vector L.

The example shown in FIG. 2 includes interface module 204, processing load partitioning module 206, and mesh of processing elements 208. Interface module 204 receives a specification of an operation to perform an element-wise sum of specified portions of a matrix (or tensor). In some embodiments, this specification is derived from input 202 (e.g., from indices and lengths vectors indicating specified portions of a matrix to sum). Interface module 204 receives input 202, receives processing results produced by mesh of processing elements 208, and returns output 210. Example implementations of interface module 204 include any hardware and/or software system, component, process, and/or application. Interface module 204 may be implemented as software components executing on one or more processors, as hardware such as programmable logic devices, as application specific integrated circuits, etc.

In some embodiments, processing load partitioning module 206 analyzes the specification of the operation received by interface module 204 in order to select a type of processing load partitioning (also referred to herein as load balancing) to be applied. In various embodiments, based on the selected type of processing load partitioning to be applied, processing load partitioning module 206 partitions processing required to perform the operation across a plurality of physical processing elements in parallel. In various embodiments, processing load partitioning module 206 forwards input 202 received by interface module 204 to mesh of processing elements 208 for processing. As described in further detail herein (e.g., see FIG. 5), processing load partitioning module 206 may select from among a plurality of load balancing techniques based on characteristics of the processing to be performed, which depends on characteristics of the particular input 202 and output 210 (since the operation works on a per request basis) and/or characteristics of the processing hardware (e.g., of mesh of processing elements 208).

Example implementations of processing load partitioning module 206 include any hardware and/or software system, component, process, and/or application. Processing load partitioning module 206 may be implemented as software components executing on one or more processors, as hardware such as programmable logic devices, as application specific integrated circuits, etc. An advantage of a hardware implementation (e.g., using specialized digital logic) is faster processing and lower latency. It is also possible to implement interface module 204 and processing load partitioning module 206 as a single combined module. In such an implementation, the combined module would receive input 202, interface with mesh of processing elements 208, and return output 210.

Figure 3A:
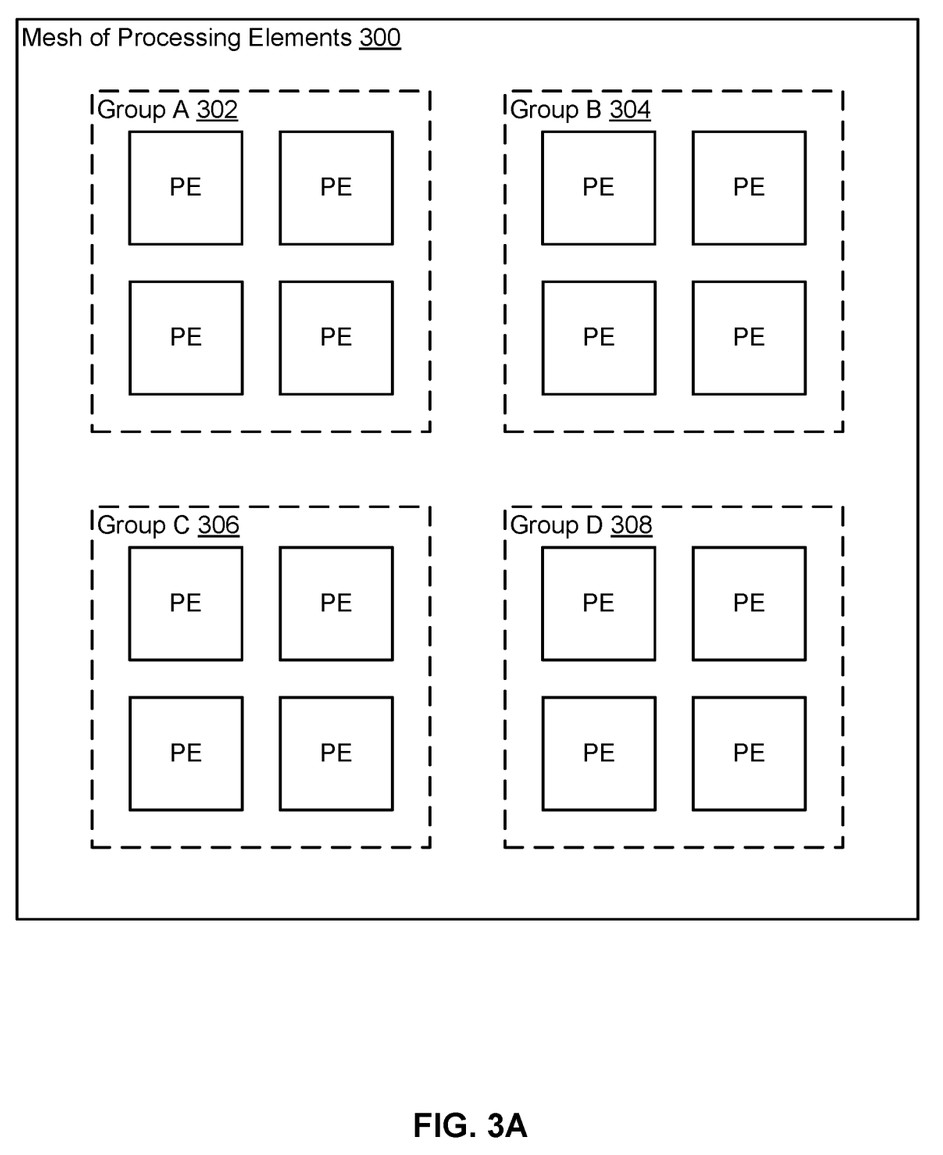
FIG. 3A illustrates an example mesh of processing elements.
Figure 3B:
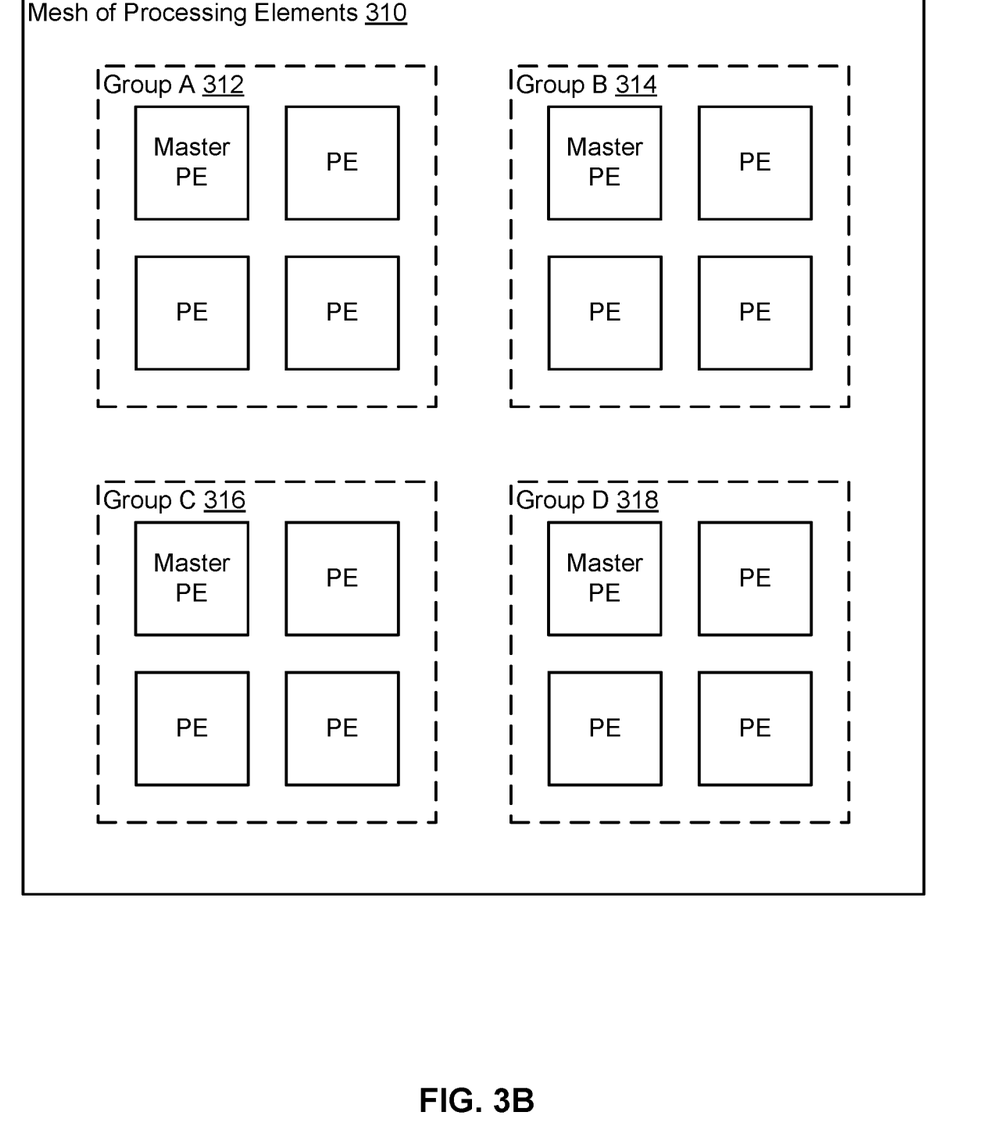
FIG. 3B illustrates an example mesh of processing elements that includes master processing elements.

In various embodiments, mesh of processing elements 208 performs processing of input 202 to produce output 210 according to a partitioned processing approach determined by processing load partitioning module 206. Each processing element in the mesh of processing elements is a physical processing element that is configured to perform element-wise addition. Examples of physical processing elements include specialized digital logic circuits, reprogrammable logic (e.g., field programmable gate arrays), application specific integrated circuits, central processing units, etc. In various embodiments, mesh of processing elements 208 distributes the partitioned processing to the physical processing elements to perform in parallel the element-wise sum of the specified portions of the matrix included in input 202 (e.g., by summing different portions of the matrix at the same time using different processing elements). FIGS. 3A and 3B illustrate in further detail example architectures for mesh of processing elements 208.

In the example illustrated in FIG. 2, portions of the communication path between the components are shown. Other communication paths may exist, and the example of FIG. 2 has been simplified to illustrate the example clearly. For example, communication channels transferring data between various components are not illustrated in full detail. Although single instances of components have been shown to simplify the diagram, additional instances of any of the components shown in FIG. 1 may exist. The number of components and the connections shown in FIG. 1 are merely illustrative. Components not shown in FIG. 1 may also exist.

FIG. 3A illustrates an example mesh of processing elements. In the example illustrated, mesh of processing elements 300 includes Group A 302, Group B 304, Group C 306, and Group D 308 of processing elements. Each individual processing element (PE) may be different in type than other processing elements. Examples of processing elements include specialized digital logic circuits, reprogrammable logic (e.g., field programmable gate arrays), application specific integrated circuits, central processing units, etc. This example is illustrative and not restrictive. Different numbers of groups, individual elements within each group, and arrangements of groups are possible.

The example illustrated shows schematic/logical groups. Groups of processing elements and/or individual processing elements are not necessarily located in the same physical location. In various embodiments, each processing element has its own private memory space (not shown in FIG. 3A) and communicates with other processing elements in regular patterns using a set of communication protocols. For example, each processing element may communicate with other processing elements and/or receive data from outside of mesh of processing elements 300 via a network (not shown in FIG. 3A). Examples of networks include one or more of the following: a direct or indirect physical communication connection, mobile communication network, Internet, intranet, Local Area Network, Wide Area Network, Storage Area Network, and any other form of connecting two or more systems, components, or storage devices together.

In various embodiments, an objective associated with the mesh of processing elements is to balance computation workload across processing elements. Because each output element (e.g., of output 210 of FIG. 2) could require a different amount of work, it is potentially desirable to assign multiple output elements to a single processing element so that the processing element does not go idle. Memory bandwidth can be a limiting factor. For example, a few processing elements may be enough to saturate memory bandwidth. In various embodiments, load balancing takes into account the balance between compute and memory bandwidth. Within group parallelism can be used to reduce memory bandwidth usage. The extent to which memory bandwidth is a limiting factor depends on the specific hardware used for processing. For example, some hardware can compute quickly but fetch data slowly (making memory bandwidth more of a concern) or vice versa (making memory bandwidth less of a concern). Thus, the specific allocation mix of processing elements handling memory-traffic related operations versus compute related operations is hardware dependent.

FIG. 3B illustrates an example mesh of processing elements that includes master processing elements. The examples illustrated in FIGS. 3A and 3B are similar (e.g., with respect to implementation of processing elements and communication between processing elements) except that the example illustrated in FIG. 3B includes master processing elements. Mesh of processing elements 310 includes Group A 312, Group B 314, Group C 316, and Group D 318 of processing elements, and each group includes a master processing element. Master processing elements may also be implemented as specialized digital logic circuits, reprogrammable logic (e.g., field programmable gate arrays), application specific integrated circuits, central processing units, etc. As described in further detail herein, master processing elements handle additional coordination tasks associated with work queues.

Figure 4:
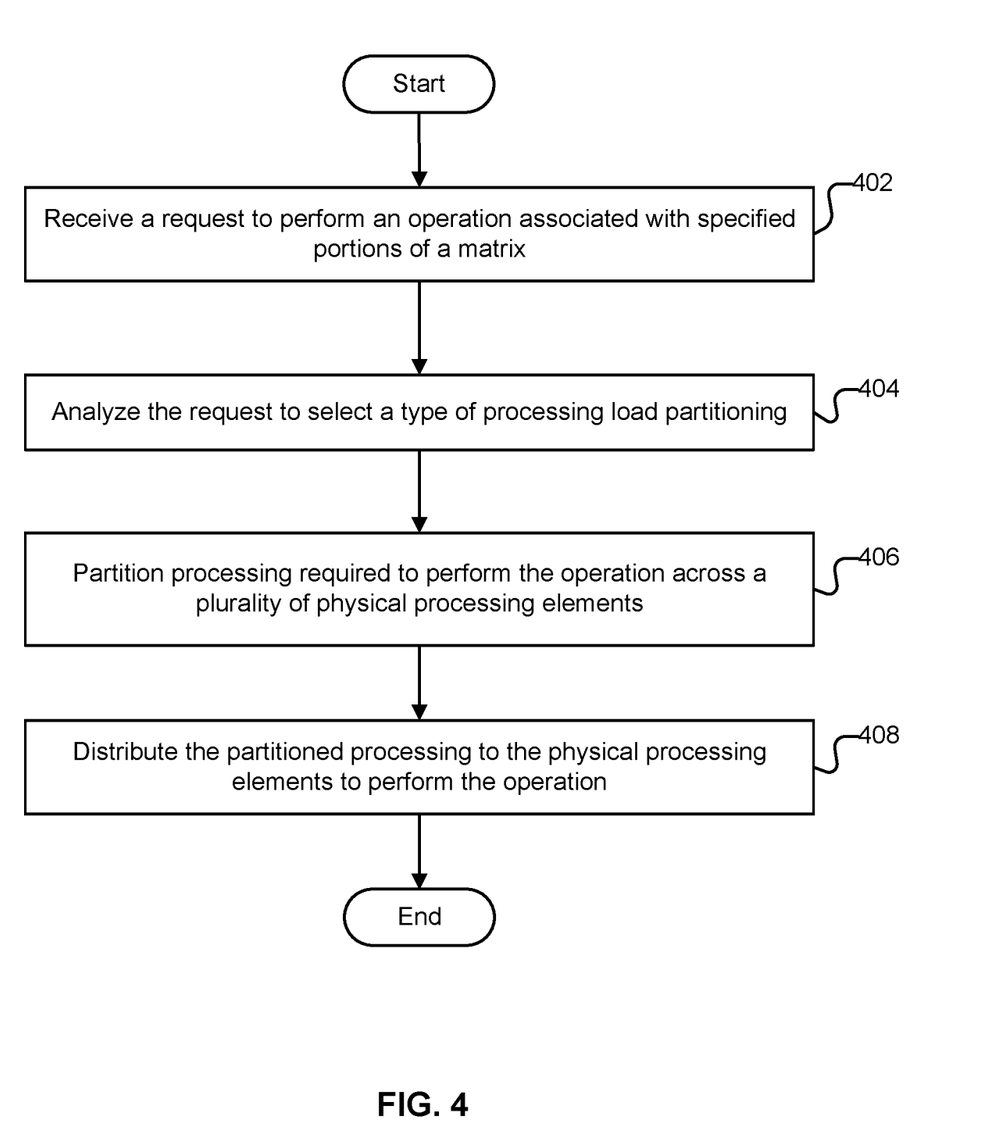
FIG. 4 is a flow chart illustrating an embodiment of a process for distributing physical processing of matrix sum operations.

FIG. 4 is a flow chart illustrating an embodiment of a process for distributing physical processing of matrix sum operations. In some embodiments, the process of FIG. 4 is performed by distributed matrix sum system 200 of FIG. 2.

At 402, a request to perform an operation associated with specified portions of a matrix is received. In some embodiments, the operation is one or more element-wise sums of the specified portions of the matrix. For example, element-wise sums along a dimension, as shown in FIGS. 1A and 1B, may be performed. As shown in FIG. 1B, an indices vector and a lengths vector associated with the matrix may be used to specify which portions of the matrix should be summed to form which outputs. In some embodiments, the request to perform the operation is received by interface module 204 of FIG. 2.

At 404, the request is analyzed to select a type of processing load partitioning. In some embodiments, this analysis is performed by processing load partitioning module 206 of FIG. 2. In some embodiments, indices and lengths vectors are analyzed (e.g., as shown in FIG. 1B). For example, the number of entries in the lengths vector corresponds to the number of output elements. Furthermore, the values of the entries in the lengths vector correspond to the relative amount of computation associated with producing each output element. For example, in FIG. 1B, the first output element requires summing of two regions of D, whereas the second output element requires summing of three regions, which corresponds to a higher computational load. In some embodiments, the computational work per output element is determined. This metric is hardware specific and can depend on the extent to which memory bandwidth is a limiting factor. For example, some hardware can compute quickly but fetch data slowly (making memory bandwidth more of a concern) or vice versa (making memory bandwidth less of a concern).

Various types of processing load partitioning (load balancing) may be selected based on the analysis. One example of a load balancing approach is to assign a specified portion of a mesh of processing elements (e.g., single processing element, a row of processing elements, a group of processing elements, etc.) to each group of indices associated with an entry in the lengths vector (corresponding to contributions to a single output element). For example, the first entry of L in FIG. 1B may be assigned to a first group in mesh of processing elements 300 of FIG. 3, and the second entry of L in FIG. 1B may be assigned to a second group in mesh of processing elements 300. In some embodiments, the entries of a lengths vector L are partitioned such that each partition's computational workload is approximately equal. For example, if L=[2, 3, 1], the first and third elements of L may be assigned to a first group of processing elements and the second element of L may be assigned to a second group of processing elements, resulting in a balanced workload across the first and second groups of processing elements. Regions of I that have approximately the same data transfer and computation requirements may be assigned to each processing element or group of processing elements. Indices of D may be partitioned across a second dimension of a mesh of processing elements to parallelize computation. As described in further detail below, the problem of partitioning L (e.g., as in the L=[2, 3, 1] example) is NP-Complete (or at best NP-Hard), for which approximate algorithms exist with varying bounds and runtimes. The load balancing approach outlined above is oftentimes more appropriate when computational work per output element is relatively low.

Another example of a load balancing approach is to assign all output elements to each processing element and task individual processing elements with computing partial contributions to the final result of each output element. In this approach, once each processing element finishes, a final reduction is performed to accumulate the partial contributions into the final result. This load balancing approach is oftentimes more appropriate when computational work per output element is relatively high because when computational work per output element is relatively high, it is more efficient to use a load balancing approach that utilizes the entire mesh of processing elements.

In some embodiments, instead of running load-balancing logic prior to computation of a matrix sum operation, a work queue in which elements of the queue correspond to output elements is used. With this approach, groups of processing elements working collaboratively on the same output element can take items from the work queue and perform the associated computation. This can be implemented by designating a master processing element per group (e.g., as illustrated in mesh of processing elements 310 of FIG. 3B) responsible for accessing the work queue atomically to determine the next index (e.g., of a lengths vector L) the group will work on. Then, the master processing element can broadcast the new index to work on to other members of the group and they can begin computation on this specific result. In terms of hardware, this requires logic to implement some form of atomicity. An advantage of using a work queue instead of a load balancing algorithm up front is reduction of overhead latency associated with the upfront load balancing algorithm. By using a work queue, balance among groups of processing elements can be maintained because any group that is idle can access the work queue to obtain more work. When no more work is available, the processing elements can simply wait for others to be finished before moving on.

At 406, processing required to perform the operation is partitioned across a plurality of physical processing elements. In some embodiments, this partitioning is performed by processing load partitioning module 206 of FIG. 2. In some embodiments, a partitioning approach of assigning a specified portion of a mesh of processing elements (e.g., single processing element, a row of processing elements, a group of processing elements, etc.) to each group of indices associated with an entry in a lengths vector is used. In some embodiments, a partitioning approach of assigning all output elements to each processing element and tasking individual processing elements with computing partial contributions to the final result of each output element is used. In some embodiments, a work queue approach is used. Other partitioning (load balancing) approaches are also possible.

At 408, the partitioned processing is distributed to the physical processing elements to perform the operation. In some embodiments, this distribution occurs in mesh of processing elements 208 of FIG. 2, mesh of processing elements 300 of FIG. 3A, or mesh of processing elements 310 of FIG. 3B. In some embodiments, this distribution is performed using a communications network connecting the physical processing elements.

Figure 5:
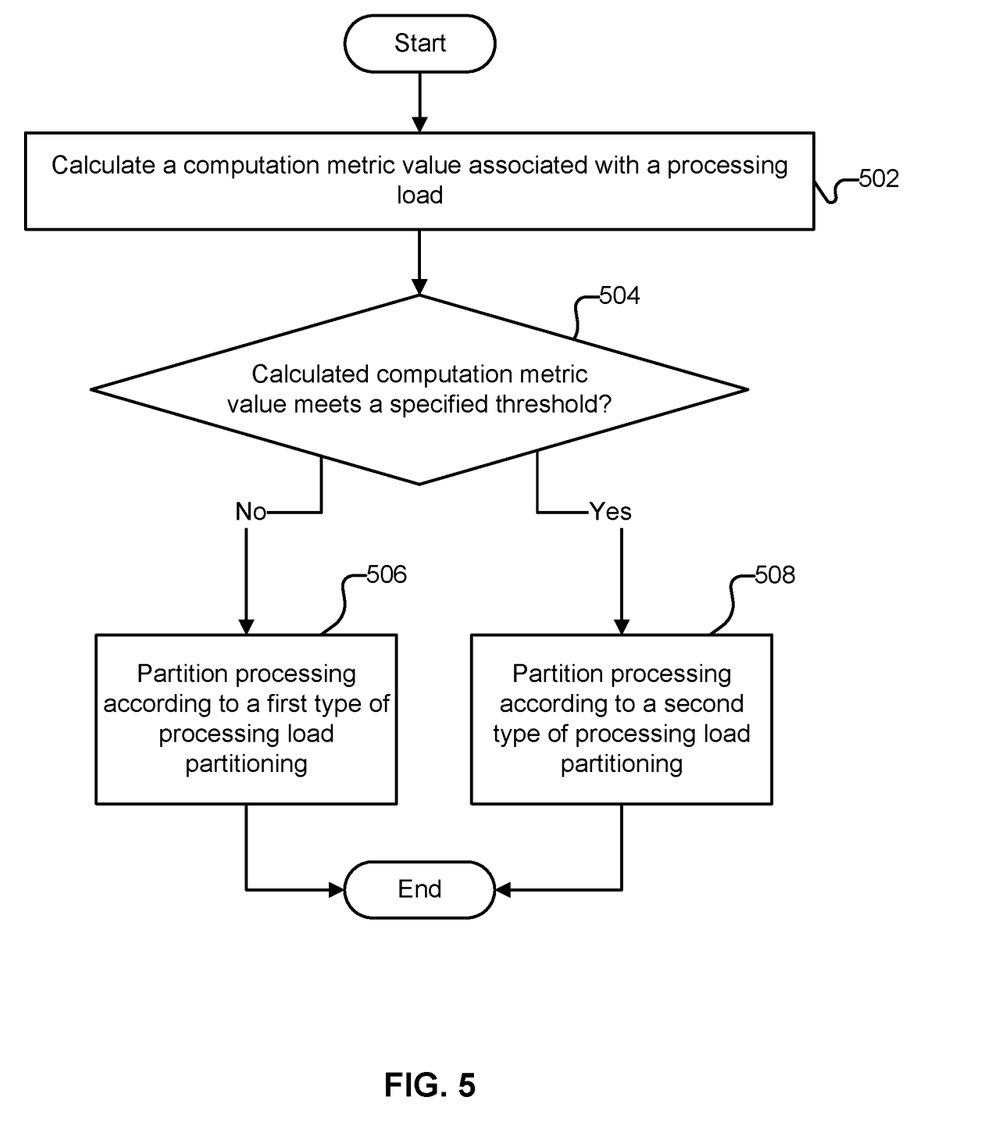
FIG. 5 is a flow chart illustrating an embodiment of a process for partitioning processing required to perform a matrix sum operation based on analysis of a computation metric.

FIG. 5 is a flow chart illustrating an embodiment of a process for partitioning processing required to perform a matrix sum operation based on analysis of a computation metric. In some embodiments, the process of FIG. 5 is performed by processing load partitioning module 206 of FIG. 2. In some embodiments, at least a portion of the process of FIG. 5 is performed in 404 and 406 of FIG. 4.

At 502, a computation metric value associated with a processing load is calculated. In some embodiments, the computation metric is based at least in part on computational work per output element.

At 504, it is determined whether the calculated computation metric value meets a specified threshold. In some embodiments, this corresponds to determining whether computational work per output element meets a hardware specific threshold. If at 504 it is determined that the computation metric does not meet the specified threshold, at 506, processing is partitioned according to a first type of processing load partitioning (load balancing). For example, when computational work per output element is relatively low, a load balancing approach of assigning a specified portion of a mesh of processing elements (e.g., a single processing element, a row of processing elements, a group of processing elements, etc.) to each group of indices associated with an entry in a lengths vector may be used. With this approach, a small set of processing elements may be assigned work while other processing elements are not utilized. Because the computational work amount is relatively low, it may not be as important from an efficiency perspective to make sure all processing elements are utilized for computation.

If at 504 it is determined that the computation metric meets the specified threshold, at 508, processing is partitioned according to a second type of processing load partitioning (load balancing). For example, when computational work per output element is relatively high, a load balancing approach of assigning all output elements to each processing element and tasking individual processing elements with computing partial contributions to the final result of each output element may be used. With this approach, each processing element is assigned a relatively large amount of work and performs approximately the same amount of computation. Because the computational work amount is relatively high, it is more important to utilize all available processing elements (e.g., all processing elements in mesh of processing elements 208 of FIG. 2 or mesh of processing elements 300 of FIG. 3A).

Figure 6:
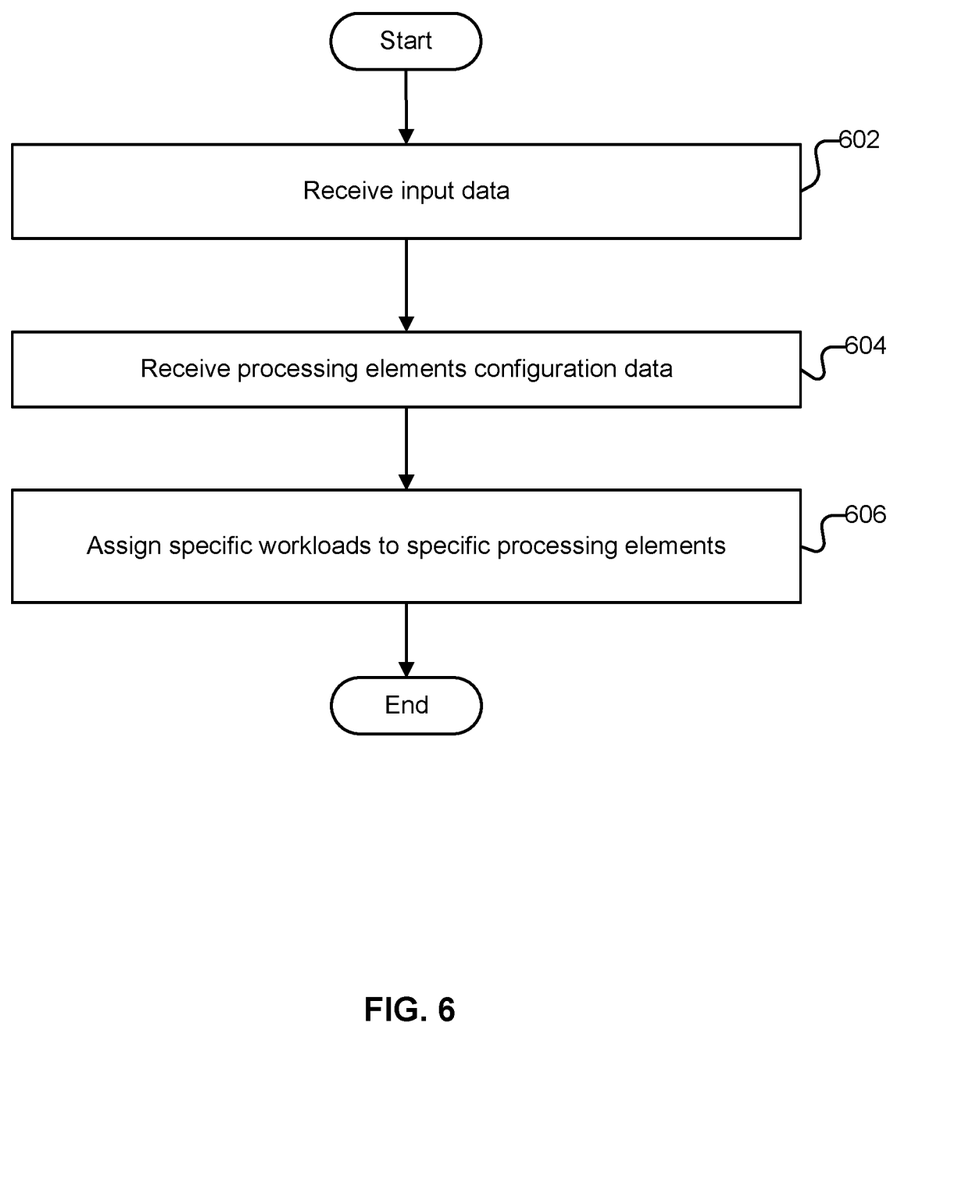
FIG. 6 is a flow chart illustrating an embodiment of a process for partitioning processing by assigning a specified portion of a mesh of processing elements to each group of indices associated with an entry in a lengths vector.

FIG. 6 is a flow chart illustrating an embodiment of a process for partitioning processing by assigning a specified portion of a mesh of processing elements to each group of indices associated with an entry in a lengths vector. In some embodiments, the process of FIG. 6 is performed by processing load partitioning module 206 of FIG. 2. In some embodiments, at least a portion of the process of FIG. 6 is performed in 506 of FIG. 5.

At 602, input data is received. In various embodiments, the input data includes a matrix D, an indices vector I, and a lengths vector L (e.g., see the example illustrated in FIG. 1B). In some embodiments, the input data is input 202 of FIG. 2.

At 604, processing elements configuration data is received. This is information associated with the processing elements available for computation (e.g., processing elements in mesh of processing elements 208 of FIG. 2 or mesh of processing elements 300 of FIG. 3A). In some embodiments, this information is updated as processing elements are added and/or removed from a mesh of processing elements. The configuration of processing elements affects parallelization of computation of a workload. For example, if each processing element has T threads available for computation, then those T threads can be used to parallelize the computation associated with each subregion of matrix D assigned to each processing element. In some embodiments, a group of processing elements is assigned a workload (e.g., a workload being a set of indices of D associated with one output element) and the processing elements of the group of processing elements are used to parallelize the computation.

At 606, specific workloads are assigned to specific processing elements. In some embodiments, assigning workloads is the NP-Complete (or at best NP-Hard) problem of assigning n workloads (corresponding to n output elements) to k partitions (corresponding to k processing elements or k groups of processing elements). Various algorithms may be used to partition the n workloads to k partitions. Examples of these algorithms (with computational efficiencies) include extended greedy algorithm ($O(2^k*n^2)$) achieving within 4/3+ 1/(3k) of optimal), greedy heuristic ($O(n*\log(n))$) achieving a discrepancy of $O(1/n)$), and Karmarkar-Karp (KK) heuristic ($O(n*\log(n))$) achieving a discrepancy of $O(1/n^{\hat{}}(\alpha*\log(n)))$ for some $\alpha$). Other algorithms are also possible. Some output elements can require much more computation than other output elements (e.g., if values in the lengths vector L are particularly non-uniform). In some embodiments, partitioning is performed such that the number of processing elements assigned to each output element is proportional to the lengths vector value L[i] associated with that output element.

If each processing element (e.g., a CPU) has T threads, the partitioning problem can be framed as assigning n workloads to k*T partitions. However, increasing the number of partitions can make the partitioning problem more computationally expensive. In order to reduce the computational expense, the T threads may be used to parallelize computation within each processing element (e.g., CPU) so that each thread acts on a subregion of a matrix portion assigned to the processing element.

Figure 7:
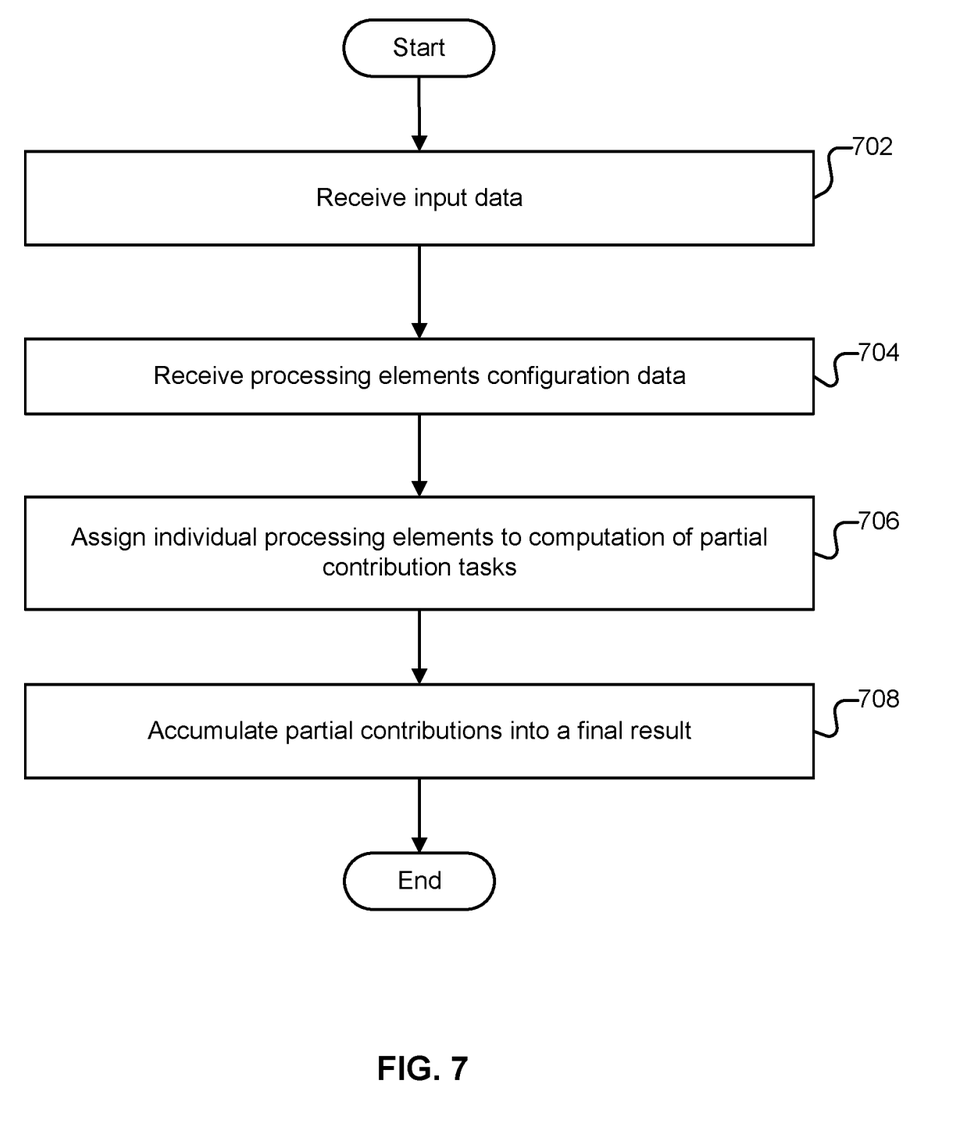
FIG. 7 is a flow chart illustrating an embodiment of a process for partitioning processing by assigning all output elements to each processing element.

FIG. 7 is a flow chart illustrating an embodiment of a process for partitioning processing by assigning all output elements to each processing element. In some embodiments, the process of FIG. 7 is performed by processing load partitioning module 206 of FIG. 2. In some embodiments, at least a portion of the process of FIG. 7 is performed in 508 of FIG. 5.

At 702, input data is received. In various embodiments, the input data includes a matrix D, an indices vector I, and a lengths vector L (e.g., see the example illustrated in FIG. 1B). In some embodiments, the input data is input 202 of FIG. 2.

At 704, processing elements configuration data is received. This is information associated with the processing elements available for computation (e.g., processing elements in mesh of processing elements 208 of FIG. 2 or mesh of processing elements 300 of FIG. 3A). In some embodiments, this information is updated as processing elements are added and/or removed from a mesh of processing elements. The configuration of processing elements affects parallelization of computation of a workload. For example, if each processing element has T threads available for computation, then those T threads can be used to parallelize the computation associated with each subregion of matrix D assigned to each processing element. In some embodiments, a group of processing elements is assigned a workload (e.g., a workload being a set of indices of D associated with one output element) and the processing elements of the group of processing elements are used to parallelize the computation.

At 706, individual processing elements are assigned to computation of partial contribution tasks. With this partitioning approach, each processing element is assigned a workload associated with each output element (e.g., a subregion of D that is a partial contribution to an output element) and no processing elements go unutilized. If each processing element has T threads, each thread may be assigned to subregions for parallelization (such as to subregions of an index of I). In various embodiments, the goal is for each processing element or thread to perform approximately the same amount of computation for each partial contribution.

At 708, the partial contributions are accumulated into a final result. Accumulation is needed because no output element is processed by a single processing element or thread. In some embodiments, accumulation logic is implemented as specialized digital logic circuits, reprogrammable logic (e.g., field programmable gate arrays), application specific integrated circuits, central processing units, etc. In some embodiments, specific processing elements are designated to perform accumulation of partial contributions into final results (e.g., output elements).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a specification of an operation to perform one or more element-wise sums of specified portions of a matrix;
   analyzing the specification of the operation to select a type of processing load partitioning to be applied;
   based on the selected type of processing load partitioning to be applied, partitioning processing associated with performing the operation across a plurality of physical processing elements in parallel, wherein:
   partitioning the processing associated with performing the operation includes determining a size of each corresponding subset of the plurality of physical processing elements assigned to each corresponding partition of the matrix based proportionally on a number of matrix elements included in the corresponding partition of the matrix, and each corresponding partition of the matrix is associated with a different output element of the operation; and distributing the partitioned processing to the plurality of physical processing elements to perform in parallel the one or more element-wise sums of the specified portions of the matrix.

2. The method of claim 1, further comprising producing one or more output elements associated with the operation.

3. The method of claim 1, wherein the specification includes a first vector indicating indices of the matrix to be included in the operation.

4. The method of claim 3, wherein the specification further includes a second vector indicating groupings of indices of the first vector.

5. The method of claim 1, wherein analyzing the specification to select the type of processing load partitioning to be applied includes determining whether a computation metric value meets a specified threshold.

6. The method of claim 5, wherein the computation metric value is based at least in part on computational work per output element of the operation.

7. The method of claim 6, wherein in response to a determination that the computation metric value does not meet the specified threshold, the selected type of processing load partitioning to be applied is associated with assigning a specified portion of the physical processing elements to each group of indices associated with an entry in a lengths vector associated with the operation.

8. The method of claim 1, wherein at least one of the physical processing elements is a field programmable gate array, an application specific integrated circuit, or a central processing unit.

9. The method of claim 1, wherein partitioning the processing associated with performing the operation includes balancing computational workloads for a set of output elements of the operation across at least a portion of the physical processing elements.

10. The method of claim 1, wherein partitioning the processing associated with performing the operation includes assigning each corresponding subset of the plurality of physical processing elements for each output element of the operation in proportion to a lengths vector value associated with each output element.

11. The method of claim 1, wherein partitioning the processing associated with performing the operation includes grouping different sets of output elements of the operation such that the different sets require equal amounts of computational resources.

12. The method of claim 1, wherein partitioning the processing associated with performing the operation utilizes at least one of the following partitioning algorithms: extended greedy algorithm, greedy heuristic, or Karmarkar-Karp heuristic.

13. The method of claim 1, wherein distributing the partitioned processing to the physical processing elements includes using a network to access the physical processing elements.

14. The method of claim 1, wherein the physical processing elements are communicatively connected via a computer network.

15. The method of claim 1, wherein determining the size of each corresponding subset of the plurality of physical processing elements assigned to each corresponding partition of the matrix includes determining a corresponding value in a lengths vector that is part of the specification and that indicates a relative computational load of each corresponding partition of the matrix.

16. The method of claim 1, wherein each corresponding subset of the plurality of physical processing elements assigned to each corresponding partition of the matrix includes a master processing element that handles coordination tasks.

17. A system, comprising:
a processor configured to:
receive a specification of an operation to perform one or more element-wise sums of specified portions of a matrix;
analyze the specification of the operation to select a type of processing load partitioning to be applied;
based on the selected type of processing load partitioning to be applied, partition processing associated with performing the operation across a plurality of physical processing elements in parallel, wherein:
the processor is configured to partition the processing associated with performing the operation including by being configured to determine a size of each corresponding subset of the plurality of physical processing elements assigned to each corresponding partition of the matrix based proportionally on a number of matrix elements included in the corresponding partition of the matrix, and
each corresponding partition of the matrix is associated with a different output element of the operation; and
distribute the partitioned processing to the plurality of physical processing elements to perform in parallel the one or more element-wise sums of the specified portions of the matrix; and
a memory coupled to the processor and configured to provide the processor with instructions.

18. A method, comprising:
receiving a specification of an operation to perform one or more element-wise sums of specified portions of a matrix;
analyzing the specification of the operation to select a type of processing load partitioning to be applied;
based on the selected type of processing load partitioning to be applied, partitioning processing associated with performing the operation across a plurality of physical processing elements in parallel, wherein partitioning the processing associated with performing the operation includes assigning computational tasks to the plurality of physical processing elements wherein assigning the computational tasks to the plurality of physical processing elements includes tasking each physical processing element of the plurality of physical processing elements with computing a partial contribution to each output sum of the operation; and
distributing the partitioned processing to the plurality of physical processing elements to perform in parallel the one or more element-wise sums of the specified portions of the matrix.

19. The method of claim 18, further comprising accumulating the partial contributions computed by the plurality of physical processing elements for each output sum of the operation.

20. The method of claim 18, wherein analyzing the specification to select the type of processing load partitioning to be applied includes determining whether a computation metric value meets a specified threshold.

\* \* \* \* \*